(12) United States Patent
Brookes

(10) Patent No.: US 7,226,045 B2
(45) Date of Patent: Jun. 5, 2007

(54) VEHICLE SUSPENSION SYSTEM

(75) Inventor: Graham R. Brookes, Carmel, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/224,571

(22) Filed: Sep. 12, 2005

(65) Prior Publication Data

US 2006/0006590 A1    Jan. 12, 2006

Related U.S. Application Data

(63) Continuation of application No. 10/214,872, filed on Aug. 7, 2002, now abandoned.

(51) Int. Cl.
*F16F 9/04* (2006.01)

(52) U.S. Cl. .............................. 267/64.27; 267/64.24; 188/322.16; 188/321.11

(58) Field of Classification Search .. 267/64.19–64.23, 267/64.24, 64.25, 220, 64.26, 64.27; 188/322.16, 188/322.17, 322.18, 322.19, 322.22, 321.11; 280/124.147, 124.155
See application file for complete search history.

(56) References Cited

U.S. PATENT DOCUMENTS

| | | | |
|---|---|---|---|
| 2,893,104 A | 7/1959 | Hancock | |
| 2,980,441 A | 4/1961 | Timpner et al. | |
| 3,700,225 A | 10/1972 | Fader et al. | |
| 4,325,541 A | 4/1982 | Korosladanyi et al. | |
| 4,635,745 A | 1/1987 | Myers et al. | |
| 4,655,438 A | 4/1987 | Cameron | |
| 4,722,516 A | 2/1988 | Gregg | |
| 4,741,517 A | 5/1988 | Warmuth, II et al. | |
| 4,988,082 A | 1/1991 | Pees | |
| 5,129,634 A | 7/1992 | Harris | |
| 5,366,048 A | 11/1994 | Watanabe et al. | |
| 5,667,203 A | 9/1997 | Römer | |
| 5,797,595 A | 8/1998 | Buma et al. | |
| 5,996,980 A * | 12/1999 | Frey et al. | ............... 267/64.27 |
| 6,089,552 A | 7/2000 | Pahl | |
| 6,116,584 A | 9/2000 | Römer | |
| 6,845,973 B2 * | 1/2005 | Ferrer | ..................... 267/64.24 |
| 2004/0017030 A1 | 1/2004 | Dehlwes et al. | |

* cited by examiner

*Primary Examiner*—Pam Rodriguez
(74) *Attorney, Agent, or Firm*—Michael R. Huber; Timothy Nauman

(57) ABSTRACT

A vehicle suspension system has a combination air spring/damper mounted between spaced first and second components of a vehicle. The damper has a fluid cylinder attached to the first vehicle component and a piston rod connected to the second vehicle component. The air spring has a piston and an end plate with an intervening flexible bellows forming an air chamber. The air spring piston is mounted on and surrounds the damper cylinder and the end plate is secured to the second vehicle component, but at a separate location from the attachment of the piston rod to distribute the loading forces at the points of attachment. A flexible sealing sleeve extends between the piston rod and an end plate opening of the air spring through which the piston rod extends. A rigid canister is mounted on the end plate of the air spring and extends about the flexible bellows and has a sealing skirt at a lower end which engages the damper cylinder.

21 Claims, 2 Drawing Sheets

VEHICLE SUSPENSION SYSTEM

This application is a continuation of U.S. patent application Ser. No. 10/214,872 filed on Aug. 7, 2002 now abandoned, which is hereby incorporated herein by reference in its entirety.

BACKGROUND OF THE INVENTION

1. Technical Field

The invention relates to vehicle suspension systems, and in particular, to a combination air spring and damper in which the mounting forces are decoupled from each other on one of the vehicle components to reduce excessive loads on the attachment locations.

2. Background Information

Numerous suspension systems have been developed which utilize a combination damper and air spring wherein the damper cylinder is mounted to one vehicle component such as the wheel suspension system, with the piston rod of the damper and air spring end plate being attached to another vehicle component such as the chassis. However, in these prior suspension systems, the air spring, and in particular the end plate thereof and the piston rod of the damper are attached at a common point. Although such attachments perform satisfactory in many applications, it does exert an excessive force on a common attachment location which absorbs both the forces exerted on the air spring as well as the damper.

BRIEF SUMMARY OF THE INVENTION

The present invention provides a vehicle suspension system having a combination damper/air spring in which the damper has a cylinder and a reciprocally mounted piston, with the cylinder being attached to one component of the vehicle and an extended end of the piston rod being attached to a second vehicle component. The air spring surrounds the damper cylinder and the air spring end plate being attached to the same vehicle component as is the piston rod, but at a spaced location therefrom in order to distribute the loads exerted on the damper and air spring to different parts of the vehicle component.

The air spring end plate is attached to a leg of the chassis frame channel and the piston rod extends through a hole in the chassis leg and is attached to the web wall of the channel spaced from the end plate attachment.

Another aspect of the invention is attaching the damper cylinder and piston rod with a flexible bushing, each consisting of a pair of concentric rigid cylinders having an intervening annulus of elastomeric material providing resilient attachments.

Another feature of the invention is to provide an elongated seal to enclose the end plate opening through which the piston rod extends to prevent the escape of air from within the air chamber of the air spring while permitting conical movement of the piston rod with respect to its attachment location to compensate for independent movement of the spaced vehicle components.

Still another feature of the invention is providing a rigid canister which extends concentrically about and entraps the flexible bellows of the air spring therein which can be either rigidly or fixedly mounted to the end plate of the air spring or the spaced vehicle component, and which is provided with a flexible sealing skirt to retard the collection of debris and dirt on the damper/air spring combination.

A further advantage of the invention is to mount the restraining cylinder by a flexible member which allows the canister to move with the damper/air spring and accommodate larger coning angles of the damper piston rod.

A further feature of the invention is to form the restraining canister of a rigid rubber material containing radial reinforcement cords, thereby providing a rigid structure unaffected by the harsh environment which is experienced by the suspension system.

Another aspect of the invention is to provide a vehicle suspension system which by separating the attachment loads, provides improved damper tuning, ride isolation from the damper bushing, improved damper bushing durability, and provides an improved ride to the vehicle by reducing the vibration exerted on the chassis by the damper/air spring combination.

The foregoing advantages, construction, and operation of the present invention will become more readily apparent from the following description and accompanying drawings.

BRIEF DESCRIPTION OF THE DRAWINGS

Similar numerals refer to similar parts throughout the drawings.

DETAILED DESCRIPTION OF THE INVENTION

Figure 1:
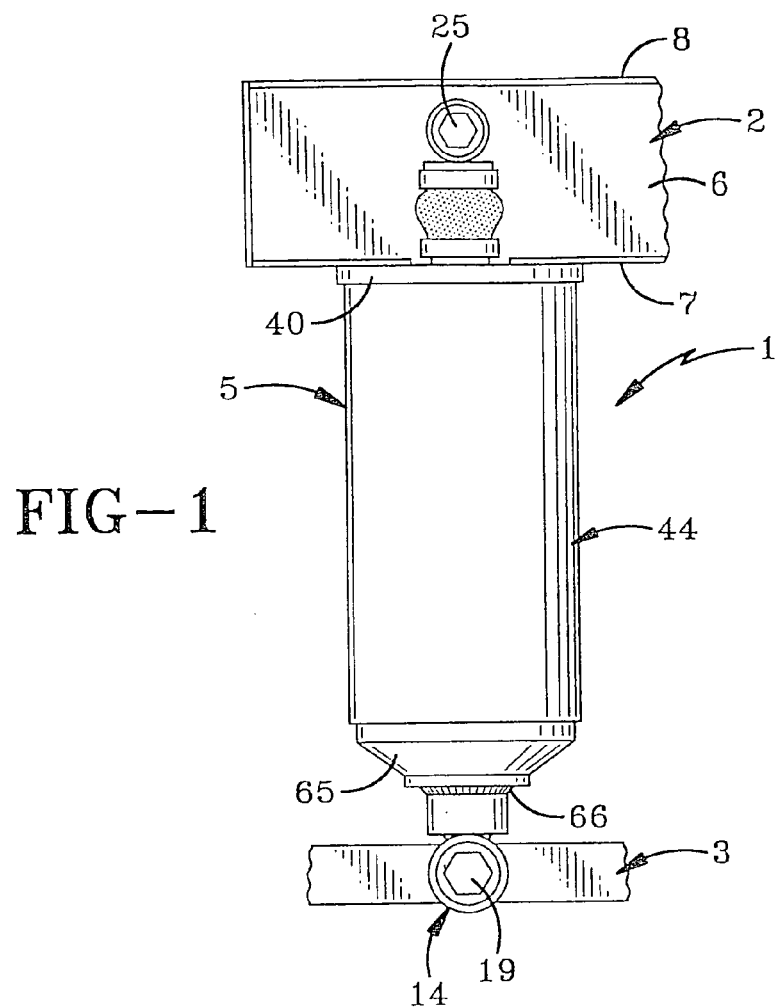
FIG. 1 is a side elevational view showing the improved vehicle suspension system.

FIG. 1 is a side elevational view of the improved vehicle suspension system which is indicated generally at 1, which includes a pair of spaced vehicle components indicated generally at 2 and 3, having an air spring/damper combination 5 mounted therebetween. Vehicle components 2 and 3 can be various structural parts of a vehicle and in the preferred embodiment, component 2 is a channel shaped chassis frame member having a web wall 6 and a pair of spaced outwardly extending channel legs 7 and 8. Lower component 3 could be various components of the wheel assembly.

Air spring/damper combination 5 (FIG. 2) includes a damper indicated generally at 10, having a cylinder 11 containing a fluid such as oil, in which is reciprocally mounted a piston rod 12. The lower end of cylinder 11 is connected to vehicle component 3 by an elastomeric bushing indicated generally at 14. Bushing 14 includes inner and outer rigid cylinders 15 and 16 respectively, between which is compressed an annular elastomeric bushing sleeve 17. A bolt 19 extends through inner cylinder 15 and is secured by a weld, nut or other attachment means to vehicle component 3. Extended end 20 of piston rod 12 is secured to web wall 6 of vehicle component 2 by a similar bushing assembly having inner and outer rigid metal cylinders 22 and 23 and an intervening elastomeric bushing sleeve 24, with a bolt 25 extending through inner cylinder 22 for attachment to web wall 6.

Air spring/damper combination 5 further includes a usual air spring 30 which includes a piston 31 which is mounted on and extends about cylinder 11. One type of mounting would be to form a central bore 33 in air spring piston 31 through which cylinder 11 is slidably mounted and retained by abutment of the end of cylinder 11 against a stepped shoulder 35 formed in piston 31. A plurality of O-rings 36 may be mounted between bore forming wall 37 and cylinder 11 to prevent the flow of air therebetween.

A usual elastomeric bellows 39 is sealingly clamped at one open end by a clamp ring 40 against the upper end of piston 31 with the other open end of bellows 39 being clamped between an annular flange 43 of an end plate 41 and the upper end of a restraining cylinder or canister 44 by another clamp ring 40 to form an internal fluid chamber 32. End plate 41 is formed with an enlarged central opening 45 defined by an annular upstanding flange 46 with piston rod 12 extending through opening 45. Flange 46 extends through a larger opening 47 formed in channel leg 7 of vehicle component 2.

In accordance with one of the main features of the invention, end plate 41 is connected to vehicle component 2 and in particular to channel leg 7 thereof, so as to be connected to component 2 at a different location than is the connection of piston rod 12 with vehicle component 2. This spaced connection separates the two forces, i.e., the force on the damper from the force on the air spring. This reduces excessive loads in either mounting system and hence, reduction in bracket and localized chassis forces that are experienced when utilizing a common mounting location. End plate 41 is connected to channel leg 7 by bolts, welds, or other types of attachments. The diameter of opening 45 is preferably sufficiently greater than the diameter of piston rod 12 to permit conical movement of piston rod 12 therein due to the independent movement of vehicle components 2 and 3, without rod 12 contacting flange 46.

In accordance with another feature of the invention, a flexible seal indicated generally at 50, closes end wall opening 45 to prevent the escape of air contained within internal fluid chamber 32 into the surrounding atmosphere, and also provides for conical movement of piston rod 12 with respect to air spring 30. Seal 50 includes a flexible air impervious sleeve 53 which is clamped to flange 46 by a clamp ring 54 and to a retaining collar 55 which is mounted on extended end 20 of piston rod 12 by another clamp ring 57. Collar 55 is attached by welding or a slip-fit connection to rod end 20 or to outer cylinder 23 of the upper mounting bushing. A plurality of 0-rings 58 may be mounted between collar 55 and piston rod 12 to provide a fluid tight seal therewith. Thus, air or other pressurized fluid in chamber 32 is prevented from escaping through end plate opening 45 to the surrounding atmosphere while permitting limited conical movement of rod 12 within opening 45.

Figure 3:
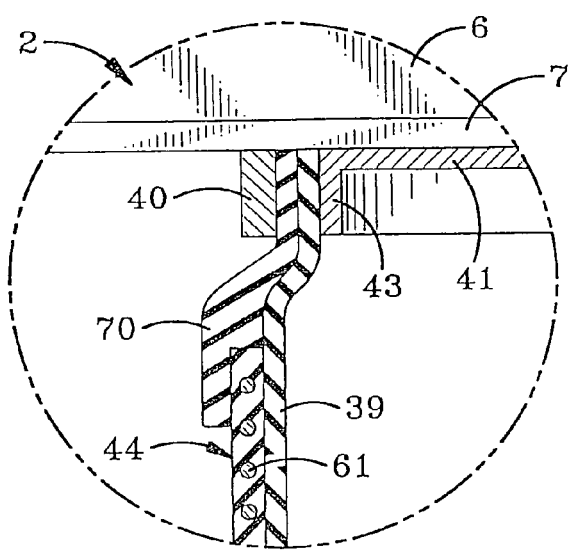
FIG. 3 is an enlarged fragmentary sectional view of a modified mounting arrangement for the outer restraining canister of the suspension system.
Figure 2:
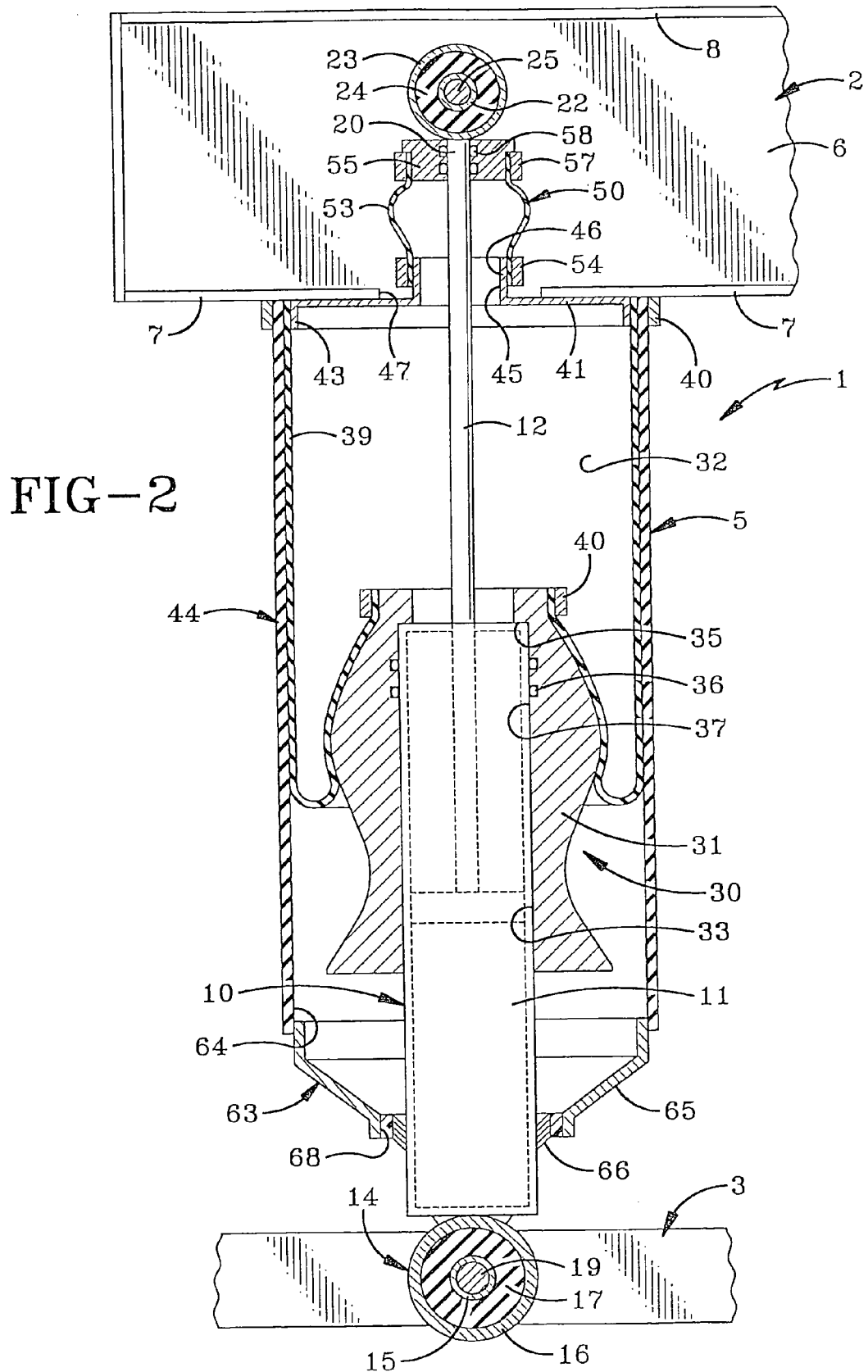
FIG. 2 is an enlarged fragmentary sectional view of FIG. 1.

In accordance with still another feature of the invention, substantially rigid restraining canister 44 surrounds air spring/damper combination 5. Canister 44 preferably is secured to end plate 41 and particularly to flange 43, by clamp ring 40 as shown in FIG. 2. Rigid canister 44 can be formed of a rigid material such as metal, plastic, or other synthetics or of a relatively stiff rubber having internal radially extending reinforcing cords 61, such as shown in FIG. 3. Canister 44 preferably extends to below piston 31 and may have a dust seal 63 mounted on the lower open end 64 of the canister to prevent the accumulation of dirt and other debris around the air spring/damper combination. Seal 63 preferably has an inwardly extending rigid skirt 65 connected to the lower open end of canister 44, with a flexible brush 66 extending between an open end 68 of the skirt and cylinder 11. This flexible brush 66 also permits limited conical movement of cylinder 11 within open end 68 of skirt 65.

A slightly modified canister mounting arrangement is shown in FIG. 3 in which canister 44 is resiliently mounted by an elastomeric sleeve 70 or other type of resilient connection, to flange 43 of end plate 41 by clamp ring 40. This flexible mounting provides for additional movement of restraining canister 44 and air spring/damper combination 5 without damaging any of the protected components, and preferably will be used when canister 44 is formed of a relatively rigid and stiff material. The flexible canister preferably will be clamped directly to end plate 41.

While embodiments of the invention have been described, the invention is not limited thereto, but can have other modifications and arrangements without affecting the concept of the invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A vehicle suspension system comprising:
    first and second spaced apart vehicle components;
    a damper having a cylinder and a piston rod reciprocally mounted therein;
    a first attachment securing the cylinder to the first vehicle component and a second attachment securing the piston rod to a first portion of the second vehicle component;
    an air spring including a piston mounted on the damper cylinder and an end plate attached to a second portion of the second vehicle component that is spaced from the first portion of the second vehicle component to which the piston rod is secured, and a flexible bellows sealingly connected to and extending between the piston and the end plate and forming an air chamber therein for containing a quantity of air, with the piston rod extending through the air chamber and through an end plate opening formed in the end plate; and
    a flexible seal extending about the end plate opening and the piston rod to retain the air within the air chamber, the flexible seal including an elongated flexible sleeve providing for conical movement of the piston rod during movement of the vehicle components, a retaining collar mounted on an extended end of the piston rod using a slip-fit connection capable of permitting relative movement between the retaining collar and the piston rod, and a clamp ring securing a first end of the elongated flexible sleeve to the collar.

2. A vehicle system according to claim 1, wherein the clamp ring is a first clamp ring, and the vehicle system further comprises a second clamp ring, and the end plate opening being defined by an annular flange with the second clamp ring securing a second end of the elongated flexible sleeve along the flange.

3. A vehicle system according to claim 1, wherein the second attachment includes inner and outer rigid concentric members, an intervening annular elastomeric bushing, and a fastener extending through an opening in said inner member.

4. A vehicle system according to claim 1 further comprising a restraining canister mounted approximately concentrically about the air spring and damper.

5. A vehicle system according to claim 4, wherein the restraining canister is secured along the end plate of the air spring and extends along an outer surface of the flexible bellows and terminates in a flexible seal which extends about the damper cylinder.

6. A vehicle system according to claim 5, wherein the flexible seal of the canister includes a flexible brush extending about and in contact with the damper cylinder.

7. A vehicle system according to claim 1, wherein the second vehicle component is a frame channel including a web wall and at least one outwardly extending channel leg having an opening with the piston rod extending therethrough, the second attachment securing the piston rod to the web wall of the frame channel.

8. A vehicle system according claim 1, wherein the first attachment is a flexible bushing.

9. A vehicle suspension system comprising:
first and second spaced apart vehicle components;
a damper having a first damper portion secured on the first vehicle component and a second damper portion reciprocally mounted on the first damper portion and secured on the second vehicle component;
an air spring including a first end member surrounding the first damper portion, a second end member attached to the second vehicle component at a spaced location from the second damper portion, and a first flexible wall sealingly connected to and extending between the first and second end members and at least partially forming a spring chamber, the second damper portion extending through the spring chamber and an opening formed in the second end member; and,
a flexible seal including a second flexible wall having opposing first and second ends and a collar sealingly disposed on an extended end of the second damper portion and forming a slip-fit connection with the second damper portion such that the collar is slidably displaceable therealong, the first end of the second flexible wall being disposed about the opening in the second end member and the second damper portion, and the second end of the second flexible wall being secured along the collar.

10. A vehicle suspension system according to claim 9, further comprising a restraining cylinder secured along the second end member of the air spring and extending along an outer surface of the first flexible wall.

11. A vehicle suspension system according to claim 10, wherein the restraining cylinder includes a rigid non-metallic elastomeric sheet containing radial reinforcement cords.

12. A vehicle suspension system according claim 9, wherein the opening in the second end member is defined by an annular flange and a clamp ring secures the first end of the second flexible wall to the annular flange.

13. A vehicle suspension system according to claim 9, wherein the second vehicle component is a frame channel having a web wall and at least one outwardly extending channel leg having an opening with the second damper portion extending through the opening, a second attachment securing the second damper portion to the web wall of the frame channel.

14. A suspension assembly for an associated vehicle having associated first and second vehicle components, said suspension assembly comprising:

a damper including a first damper member secured on the associated first vehicle component, and a second damper member reciprocally supported on said first damper member and including an end portion secured on a first portion of the associated second vehicle component;

an air spring including a first end member having a first opening extending therethrough, a second end member having a second opening extending therethrough, and a first flexible wall secured on said first and second end members and at least partially defining an air chamber therebetween, said first end member supported along said first damping member such that said second damping member extends through said first opening, said second end member supported on a second portion of the associated second vehicle component such that said end portion of said second damping member is disposed outwardly of said air chamber;

a collar disposed along said second damping member in substantially fluid-tight association therewith, said collar being slidably supported along said second damping member; and, a second flexible wall supported on said collar and one of said second end member or the second portion of the associated second vehicle component thereby maintaining said end portion of said second damping member outside said air chamber and retaining air within said air chamber.

15. A suspension assembly according to claim 14 further comprising an attachment member secured on said end portion of said second damping member and securing said attachment member on the first portion of the associated second vehicle component.

16. A suspension assembly according to claim 15, wherein said attachment member is secured on said end portion separately from said collar.

17. A suspension assembly according to claim 14, wherein said collar is slideably supported on said second damping member.

18. A suspension assembly according to claim 14 further comprising a sealing ring disposed between said collar and said second damping member.

19. A suspension assembly according to claim 14, wherein at least one of said first or second flexible walls is an approximately cylindrical flexible sleeve formed from an air impervious material.

20. A suspension assembly according to claim 14 further comprising a restraining cylinder disposed along said first flexible wall.

21. A suspension assembly according to claim 20 further comprising an elastomeric mounting sleeve having opposing first and second ends, said first end secured along a portion of said second end member, and said second end secured along a portion of said restraining cylinder.

* * * * *